United States Patent [19]

Carty et al.

[11] Patent Number: 4,554,721
[45] Date of Patent: Nov. 26, 1985

[54] METHOD OF MANUFACTURING A WEAR RESISTANT PIPE

[75] Inventors: Michael W. Carty, Narragansett, R.I.; Guenther M. Kraus, Windsor, Conn.

[73] Assignee: Combustion Engineering, Inc., Windsor, Conn.

[21] Appl. No.: 535,516

[22] Filed: Sep. 26, 1983

[51] Int. Cl.⁴ ............................................. B23P 17/00
[52] U.S. Cl. .................................. 29/416; 29/157 A; 29/157 T; 29/455 R; 29/463; 29/458; 138/147; 138/149; 406/193
[58] Field of Search ............... 29/416, 157 A, 455 R, 29/458, 463, 157 T, 526 R; 138/147, 148, 145, 149, 140; 228/122; 406/193

[56] References Cited

U.S. PATENT DOCUMENTS

| Re. 31,020 | 8/1982 | Funk | 228/122 |
|---|---|---|---|
| 785,176 | 3/1905 | Mommertz | 406/193 |
| 926,423 | 6/1909 | Kelly | 138/147 X |
| 1,246,189 | 11/1917 | Vanderlip | 406/193 |
| 1,518,705 | 12/1924 | Raun | 406/193 |
| 1,618,455 | 2/1927 | Lindsay | 138/149 X |
| 1,668,635 | 5/1928 | De Stefani | 138/149 |
| 3,559,694 | 2/1971 | Valberg | 138/147 |
| 4,054,985 | 10/1977 | Aleniusson | 29/416 |
| 4,199,010 | 4/1980 | McGuth et al. | 138/140 |
| 4,287,245 | 9/1981 | Kikuchi | 138/145 X |

FOREIGN PATENT DOCUMENTS

| 552340 | 12/1956 | Italy . | |
| 16809 | 2/1980 | Japan | 406/193 |

*Primary Examiner*—Charlie T. Moon
*Attorney, Agent, or Firm*—Troxell K. Snyder

[57] ABSTRACT

A non-linear pipe segment, such as an elbow or the like, is disclosed having an inner liner (14) of a wear-resistant material. The outer shell of the segment is in two halves (10, 12) which are coated with a layer of bedding material (16) before being secured around the lines (14) by clamping means (28).

2 Claims, 5 Drawing Figures

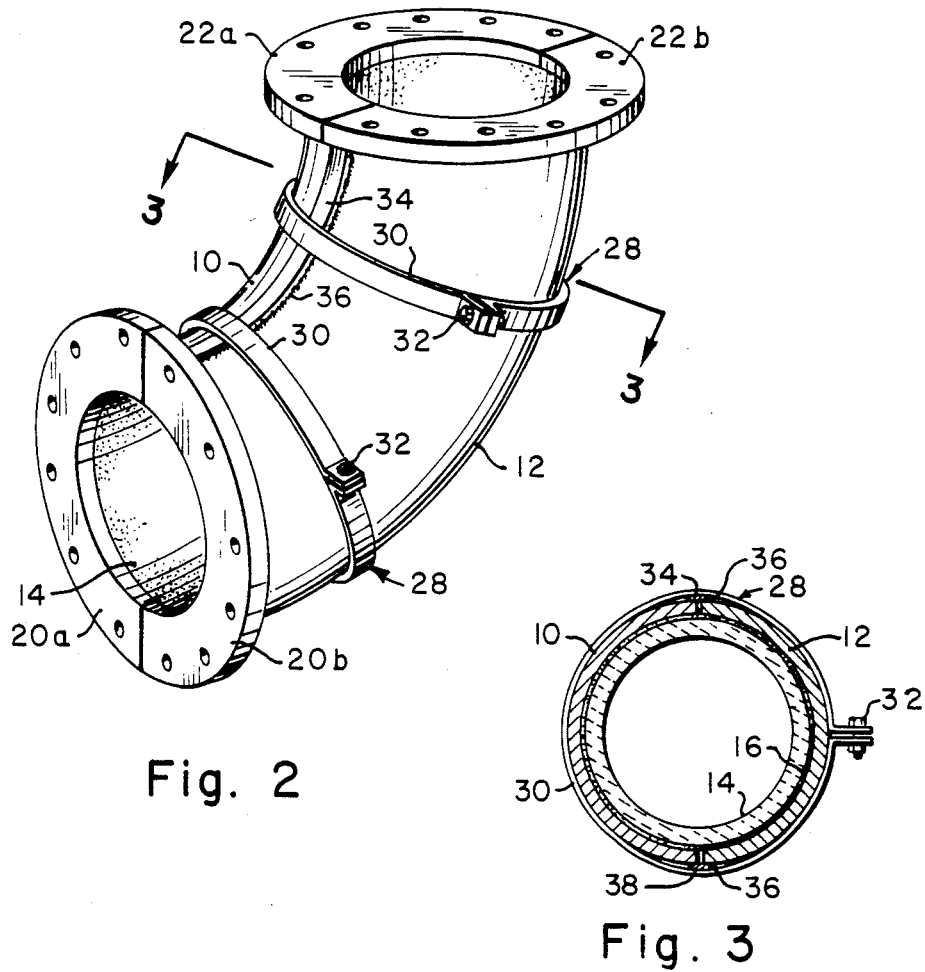
Fig. 2
Fig. 3
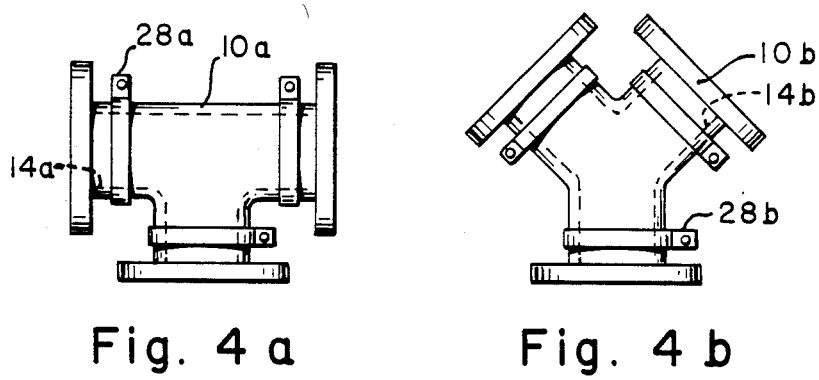
Fig. 4a    Fig. 4b

METHOD OF MANUFACTURING A WEAR RESISTANT PIPE

FIELD OF THE INVENTION

The present invention relates to a wear-resistant pipe segment and a method of manufacture therefor, and more particularly, to a wear-resistant pipe segment having a replaceable inner liner.

BACKGROUND OF THE INVENTION

The transport of gaseous, liquid, or solid material through a closed conduit or pipe has long been known in the art of material handling. In those applications wherein at least a portion of the material transported is of an abrasive nature, the occurrence of erosion of the pipe or conduit sidewalls is also well known. This undesirable erosion is commonly experienced throughout the material transport piping, but is most acute in the non-linear pipe segments wherein the flow direction of the abrasive material is altered.

In an attempt to reduce or eliminate the erosion of non-linear pipe segments, past practitioners in the art have developed a wide variety of shaping, diverting, and strengthening strategies which will not be herein described in detail. Suffice to say that one moderately successful strategy has involved the use of a composite pipe segment comprising an inner liner fabricated of an abrasion-resistant material and an outer supporting shell of a more resilient, though less abrasion-resistant, material.

Such a system is well disclosed in U.S. Pat. Nos. 4,199,010 issued to McGuth et al and Re. 31,020 issued to Funk, which to the applicant's mind represent the current state of the art of wear-resistant pipe bends. Funk shows a plurality of discrete wear strips attached to the inside wall of a curved pipe segment. The strips are placed so as to cover the area of the pipe segment most likely to be eroded by the abrasive material being transported. The wear strips of Funk must be arranged individually within the outer pipe shell and each secured in place.

Alternatively, McGuth shows a monolithic ceramic liner of abrasion-resistant material disposed within an outer metal shell and having a bed of refractory material in the annular space therebetween. The outer shells of the McGuth curved pipe segments are formed of a plurality of smaller straight pipe sections which are mitered angularly and assembled into a non-linear shell around the monolithic inner liner.

The use of an inner liner of abrasion-resistant material, while significantly slowing the erosion of the non-linear pipe segment, does not stop the occurrence of significant wear over an extended period of operation. In each of the above prior art designs, the removal and subsequent replacement of the inner erosion-resistant liner proves to be a difficult, and perhaps prohibitively costly, undertaking. In Funk, the individual wear strips must be removed along with the weld beads used for their attachment. The amount of effort involved is comparable to that incurred in fabricating a new non-linear pipe segment and, when the transport system downtime is taken into account, may be more costly than simply replacing the worn pipe segment with a new one. Likewise, the wear-resistant conduit of McGuth requires disassembly of the mitered linear outer shell segments in order to exchange the worn monolithic liner with a new replacement. The fact that the outer shell segments are joined by welding reduces the attractiveness of this replacement strategy to such a level as to make it virtually non-occurring in competitive commerical situations.

The prior art pipe segments therefore, while effectively reducing interior wear through the use of a wear-resistant lining material, are difficult to refurbish as the inner liner eventually does wear. This drawback has been unaddressed in the prior art until the present invention.

SUMMARY OF THE INVENTION

The present invention includes a wear-resistant pipe segment which has an inner, one-piece, wear-resistant liner and an outer supporting shell. The outer shell is longitudinally split to allow removal and replacement of the inner liner. A bed of refractory or other cushioning material between the liner and the shell cushions the interface and fills any gaps which may be present.

The outer shell is fabricated as with any standard segment of pipe, even including the welding of flanges onto a metallic shell, and is then split longitudinally to allow the insertion of bedding material and the inner liner. The two halves of the outer shell are then clamped together and secured to form the finished pipe segment. Upon wearing of the inner liner, the outer shell may be unclamped and separated for the removal and replacement of the inner liner.

The wear-resistant pipe section according to the present invention thus includes the features of being both simple to manufacture and easy to maintain when compared to the prior art methods and products in the field.

BRIEF DESCRIPTION OF THE DRAWING FIGURES

FIG. 2 shows an assembled pipe segment according to the present invention.

FIG. 3 shows a sectional view of an assembled pipe segment according to the present invention.

FIGS. 4a and 4b show alternative embodiments according to the present invention.

BRIEF DESCRIPTION OF THE PREFERRED EMBODIMENT

Figure 1:
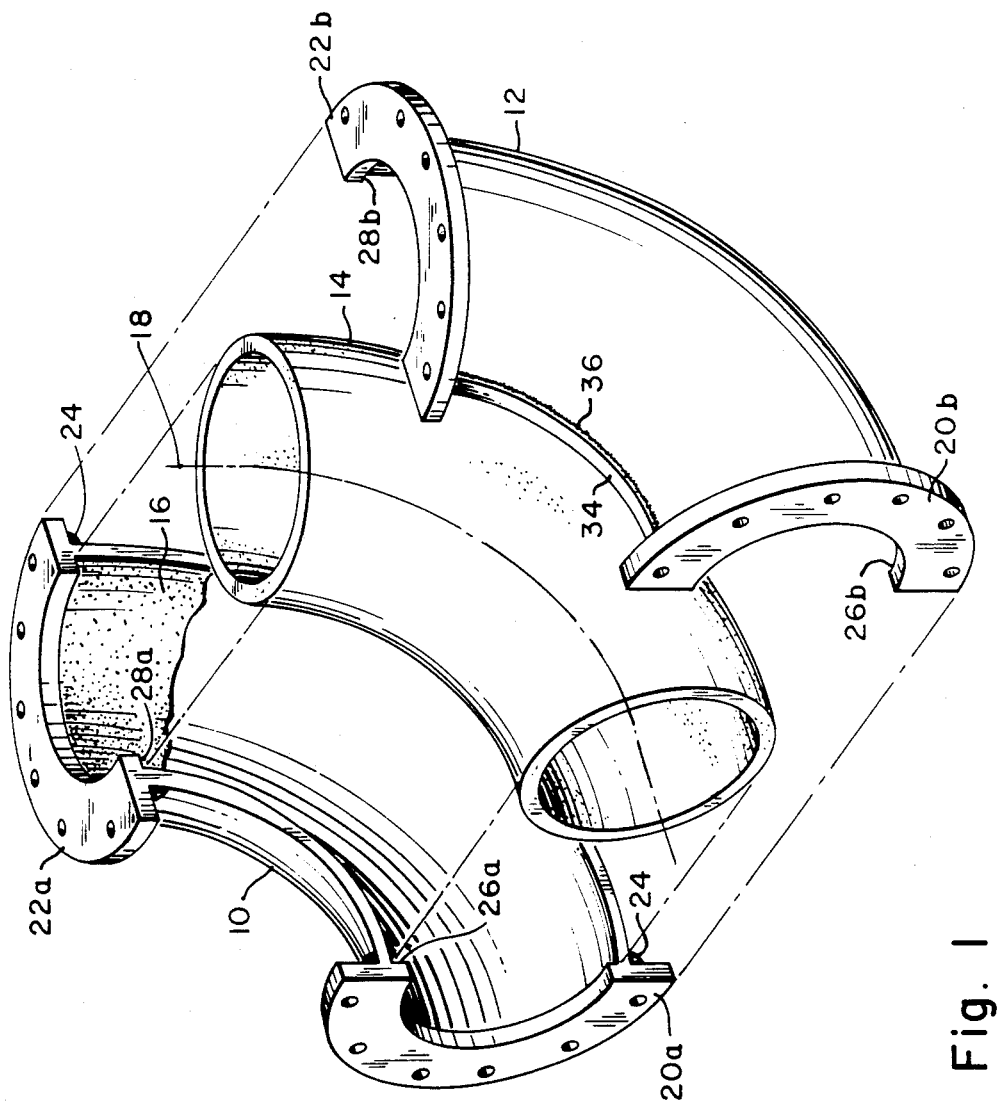
FIG. 1 shows the unassembled elements of a pipe segment according to the present invention.

FIG. 1 shows an elbow pipe segment, according to the present invention, in a pre-assembled state. Shown is an internal liner 14 composed of a wear-resistant material, formed in the shape of a curved conduit. The inner liner 14 is preferably composed of a ceramic material, such as silicon nitride or high density alumina, and may be fabricated by any of a number of methods well known in the ceramic art, such as spin casting, static casting, etc.

Also shown are two halves 10, 12 of an outer liner which is configured to surround the inner liner 14 in a protective and supportive fashion. The division between the halves 10, 12 of the outer shell has been made in a longitudinal fashion with respect to the flow path 18 through the inner liner 14. The outer shell is preferably made of metal, such as carbon or stainless steel.

Flanges halves 20a, 20b, 22a, 22b are shown welded 24 or otherwise secured to the halves 10, 12 of the outer shell. These flange halves allow the assembled pipe segment to be secured to adjoining pipe segments or machinery. Also included as a part of each flange half 20a, 20b, 22a, 22b, is an inwardly projecting annular lip 26a, 26b, 28a which acts to retain the inner liner 14 within the assembled pipe segment by preventing the liner 14 from slipping longitudinally within the outer shell halves 10, 12.

Also shown in FIG. 1 is a seal strip 34 shown welded 36 to one of the halves 12. When the halves 10, 12 are clamped together as discussed below, the seal strip 34 overlaps the longitudinal division between the clamped halves 10, 12 to protect against excessive leakage between the halves 10, 12 upon wearing of the liner 14. A second seal strip 38 (not visible in FIG. 1) covers the second longitudinal seam between the shell halves 10, 12.

Finally, FIG. 1 shows a bedding material 16 which has been deposited on a portion of the interior of one half 10, of the outer shell. This bedding material 16 is preferably a cementitious or refractory material which is modable, at least prior to any curing which may take place, and is suitable for withstanding the operating temperature environment of the pipe segment. Prior to assembly of the pipe segment, the bedding material would be deposited over the entire interior surface of both halves 10, 12 of the outer shell for the purpose of filling any gap which may be present between the inner liner 14 and the outer shell halves 10, 12.

FIG. 2 shows an elbow pipe segment according to the present invention in the assembled state. Outer shell halves 10, 12 surround the outer portion of the inner liner 14 both protecting and supporting it. The flange sections 20a, 20b, 22a, 22b form a suitable means for securing the pipe segment to adjacent machinery or other pipe segments. Seal strip 34 is visible overlapping the longitudinal division between the clamped outer shell halves 10, 12.

Clamping means 28 are shown in the form of bands 30 which encircle the outer shell halves 10, 12 circumferentially and exert a compressive force by means of the action of the screw means 32, also shown in the drawing figure. If should be understood that the clamping means 28 illustrated in the drawing figure are but one of a wide variety of such devices known in the art and as their function may thus equivalently be fulfilled by clamping means employing cams, dogs, tension bolts or other means.

FIG. 3 shows a cross sectional view of the pipe segment as indicated in FIG. 2. The outer shell halves 10, 12 are shown encircling the inner liner 14. Any annular gap which may exist between the outer shell halves 10, 12 and the inner liner 14 is filled by the bedding material 16. The clamping means 28 in the form of the band 30 and the compressing bolt 32 is also shown. The outer shell 10, 12 thus supports and protects the exterior surface of the liner 14 while itself being protected from erosion by the liner 14.

FIGS. 4a and 4b depict the external configuration of two alternative embodiments according to the present invention. FIG. 4a is a T-shaped fitting, with outer shell half 10a and inner liner 14a as indicated. FIG. 4b is of a Y-shaped fitting, again with outer shell half 10b and inner liner 14b indicated therein.

It is a feature of the pipe segment according to the present invention that the segment be easily fabricated and easily refurbished in the field. The pipe segment according to the present invention may be most easily fabricated by first fabricating the outer shell as a monolithic pipe section by means of any currently available pipe making process. By way of example, a straight section of pipe produced by a continuous tube mill is bent into a curved shape by a tube bender and cut to the appropriate length. Standard circular flanges are then welded to each end, thus resulting in a standard flanged pipe elbow.

The complete standard elbow is then divided longitudinally by a saw or other cutting means, thus producing the outer shell halves 10, 12 of the pipe segment according to the present invention. An inner liner 14 is prepared having an outer diameter chosen to allow the liner 14 to fit within the outer shell halves 10, 12.

The bedding material 16 is added, as discussed above, the liner placed between the halves 10, 12 and the entire assembly clamped together by clamping means 28.

By using standard pipe fabrication methods for producing the outer shell, the method for producing the pipe segment according to the present invention reduces both the time and investment cost necessary to produce these wear-resistant, non-linear pipe segments. After use in the field, the inner liner 14 may be easily replaced when worn by simply unclamping the outer shell halves 10, 12 and removing the worn liner 14 and old bedding material 16. A new liner 14 may then be bedded on fresh bedding material 16, and the entire segment re-assembled and put back into service. As in the manufacturing process described above, this method for refurbishing the pipe segment according to the present invention reduces both the time and equipment costs inherent to the replacement of wear-resistant pipe segments known in the prior art.

Both these and other advantages and embodiments of the present invention will be apparent to one skilled in the art upon close examination of the foregoing specification and the appended claims and drawing figures.

We claim:

1. A method of manufacturing a wear-resistant non-linear tubular pipe segment, comprising the steps of:
   fabricating an outer metallic support shell in the shape of a non-linear tubular pipe segment;
   fabricating an inner, wear-resistant ceramic non-linear tubular liner in one piece for inclusion wholly within the outer shell;
   splitting the outer shell longitudinally into a first half and a second half;
   coating the interior of each shell half with a moldable bedding material;
   placing the wear-resistant, one piece liner between the coated halves of the outer shell and embedding the liner in the moldable coating therewithin; and
   clamping and securing the halves of the outer shell together about the liner.

2. The method according to claim 1, wherein the step of fabricating the outer metallic shell further includes the step of securing a flange to each end of the metallic shell.

* * * * *